(12) United States Patent
Matsuda

(10) Patent No.: US 9,891,715 B2
(45) Date of Patent: Feb. 13, 2018

(54) INFORMATION PROCESSOR, INFORMATION PROCESSING METHOD AND PROGRAM

(71) Applicant: SONY CORPORATION, Tokyo (JP)

(72) Inventor: Kouichi Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/708,680

(22) Filed: May 11, 2015

(65) Prior Publication Data
US 2015/0241986 A1 Aug. 27, 2015

Related U.S. Application Data

(63) Continuation of application No. 13/049,445, filed on Mar. 16, 2011, now Pat. No. 9,058,057.

(30) Foreign Application Priority Data

Mar. 29, 2010 (JP) .................................. 2010-076301

(51) Int. Cl.
*G06F 3/01* (2006.01)
*G06F 3/00* (2006.01)
(Continued)

(52) U.S. Cl.
CPC ............. *G06F 3/017* (2013.01); *G02B 27/01* (2013.01); *G02B 27/017* (2013.01); *G02B 27/0172* (2013.01); *G06F 3/005* (2013.01); *G06F 3/012* (2013.01); *G06F 3/013* (2013.01); *G06F 3/0304* (2013.01); *G06F 3/048* (2013.01); *G06K 9/00355* (2013.01); *G06K 9/00671* (2013.01);
(Continued)

(58) Field of Classification Search
CPC ............ G02B 2027/0174; G02B 27/01; G02B 27/017; G02B 27/0172; G06F 3/005; G06F 3/012; G06F 3/013; G06F 3/017; G06F 3/0304; G06F 3/048; G06K 9/00355; G06K 9/00671; H04N 1/00381
See application file for complete search history.

(56) References Cited

U.S. PATENT DOCUMENTS 7,620,316 B2 * 11/2009 Boillot ................ G06F 3/017
345/156
7,626,596 B2 * 12/2009 Kotake ................ G06T 15/205
345/632
(Continued)

FOREIGN PATENT DOCUMENTS

JP 06-153016 5/1994

*Primary Examiner* — Yong Hang Jiang
(74) *Attorney, Agent, or Firm* — Paratus Law Group, PLLC

(57) ABSTRACT

Disclosed herein is an information processor including, a storage section configured to store data representing the appearance features of a target device and data of an operation image used for operation of the target device, an acquisition section configured to acquire an image captured by a camera, a recognition section configured to recognize an object included in the image based on the feature quantity data stored in the storage section, and a display control section configured to display the operation image based on the data of the operation image stored in the storage section if the object included in the image is recognized by the recognition section as the target device.

15 Claims, 18 Drawing Sheets

(51) Int. Cl.
*G02B 27/01* (2006.01)
*G06F 3/03* (2006.01)
*G06F 3/048* (2013.01)
*G06K 9/00* (2006.01)
*H04N 1/00* (2006.01)

(52) U.S. Cl.
CPC . *H04N 1/00381* (2013.01); *G02B 2027/0174* (2013.01)

(56) References Cited

U.S. PATENT DOCUMENTS

| | | | |
|---|---|---|---|
| 2005/0196046 A1* | 9/2005 | Hudnut | A47J 37/00 382/218 |
| 2006/0028400 A1* | 2/2006 | Lapstun | G02B 26/06 345/8 |

* cited by examiner

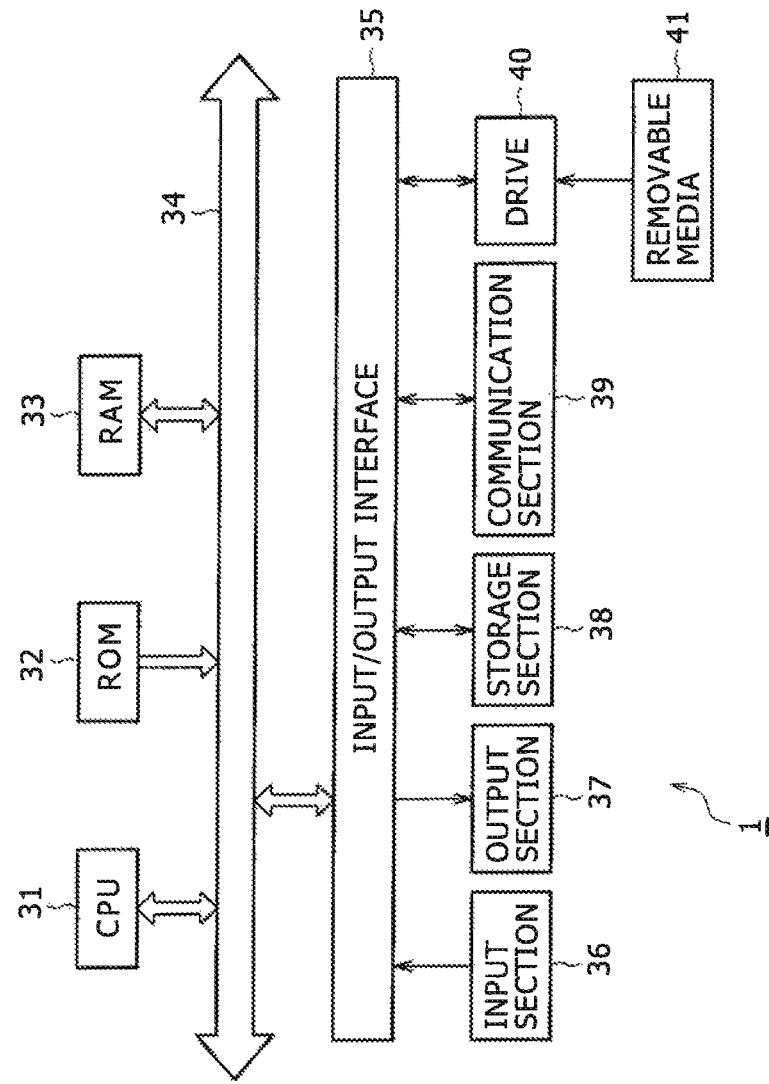
F I G . 5

FIG. 9
CAMERA IMAGE
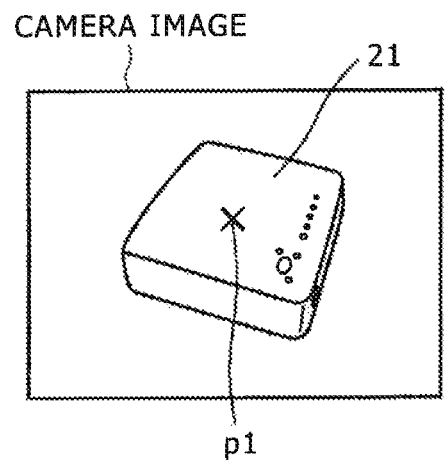
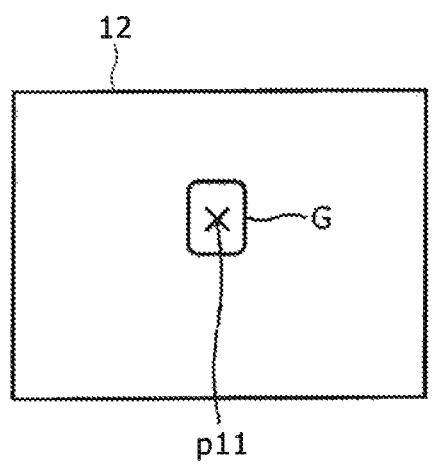
WHAT THE USER SEES
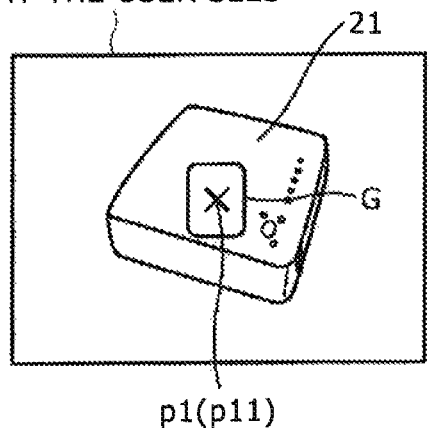

INFORMATION PROCESSOR, INFORMATION PROCESSING METHOD AND PROGRAM

CROSS REFERENCE TO PRIOR APPLICATION

This application is a continuation of U.S. patent application Ser. No. 13/049,445 (filed on Mar. 16, 2011), which claims priority to Japanese Patent Application No. 2010-076301 (filed on Mar. 29, 2010), which are all hereby incorporated by reference in their entirety.

BACKGROUND OF THE INVENTION

1. Field of the Invention

The present invention relates to an information processor, information processing method and program and, more particularly, to an information processor, information processing method and program that allow remote operation of a target device with more ease.

2. Description of the Related Art

In order to operate a home electric appliance or other device, it is common to press the switch provided on the main body of the target device or press the switch on the wall if the target device is a lighting device. Further, if Located at a distance, the target device is operated with a remote controller.

Japanese Patent Laid-Open No. Hei 6-153016 discloses a technique adapted to remotely operate a target device by displaying an operation menu on a viewer in the form of eyeglasses and detecting the user's operation of the operation menu.

SUMMARY OF THE INVENTION

In order to operate a target device by pressing the switch, the operator must move to where the switch is located for operation. Further, the operator must remember the location of the switch for each target device.

In order to operate a target device with a remote controller, there is no need for the operator to move. However, the operator must look for the remote controller and hold it in his or her hand, and then look for the right switch (button) and press it. Further, the remote controllers are different in shape. Therefore, the operator must remember the switch positions on the remote controller for each target device.

The present invention has been made in light of the foregoing, and it is an aim of the present invention to remotely operate a target device with more ease.

According to an embodiment of the present invention there is provided an information processor including a storage unit, an acquisition unit, a recognition unit and a display control unit. The storage unit stores data representing the appearance features of a target device and data of an operation image used for operation of the target device. The acquisition unit acquires an image captured by a camera. The recognition unit recognizes an object included in the image based on the feature quantity data stored in the storage unit. The display control unit displays the operation image based on the data of the operation image stored in the storage unit if the object included in the image is recognized by the recognition unit as the target device.

The display control unit can display the operation image at the position of a display corresponding to the in-image position of a target device included in the image.

The information processor can further include a finger recognition unit and a control unit. The finger recognition unit recognizes the in-image position of a finger of the user included in the image captured by the camera. The control unit transmits a command to the target device if the in-image position of the finger of the user recognized by the finger recognition unit is corresponding to the position of the operation image displayed on the display. The command instructs an operation to be performed using the operation image.

The finger recognition unit can further recognize the in-image size of the finger of the user included in the image. The control unit can transmit the command when the finger of the user in the image is located at the position corresponding to the position of the operation image displayed on the display and when, at that position, the in-image size of the finger of the user becomes larger again after having become smaller than immediately before.

The finger recognition unit can further recognize the in-image size of the finger of the user included in the image. The control unit can transmit the command when the finger of the user in the image is located at the position corresponding to the position of the operation image displayed on the display and when, at that position, the in-image size of the finger of the user becomes smaller than immediately before.

The information processor can still further include a setting information storage unit adapted to store setting information representing the details of settings related to the display of the operation image. In this case, the display control unit can control the display of the operation image according to the details of the setting information.

According to another embodiment of the present invention there is provided an information processing method including steps of storing data representing the appearance features of a target device and data of an operation image used for operation of the target device, acquiring an image captured by a camera, recognizing an object included in the image based on the feature quantity data stored in the storage unit, and displaying the operation image based on the data of the operation image stored in the storage unit if the object included in the image is recognized by the recognition unit as the target device.

According to yet another embodiment of the present invention there is provided a program causing a computer to perform a process including the steps of storing data representing the appearance features of a target device and data of an operation image used for operation of the target device, acquiring an image captured by a camera, recognizing an object included in the image based on the feature quantity data stored in the storage unit, and displaying the operation image based on the data of the operation image stored in the storage unit if the object included in the image is recognized by the recognition unit as the target device.

In the mode of the present invention, data representing the appearance features of a target device and data of an operation image used for operation of the target device are stored. An image captured by a camera is acquired. An object is recognized that is included in the image based on the feature quantity data stored in the storage unit. The operation image is displayed based on the data of the operation image stored in the storage unit if the object included in the image is recognized by the recognition unit as the target device.

The present invention allows for remote operation of target device with more ease.

BRIEF DESCRIPTION OF THE DRAWINGS

FIG. 5 is a block diagram illustrating an example of hardware configuration of the information processor;

FIG. 9 is a group of diagrams describing the display position of the operation image;

DETAILED DESCRIPTION OF THE PREFERRED EMBODIMENTS

First Embodiment

[MR (Mixed Reality) System]

Figure 1:
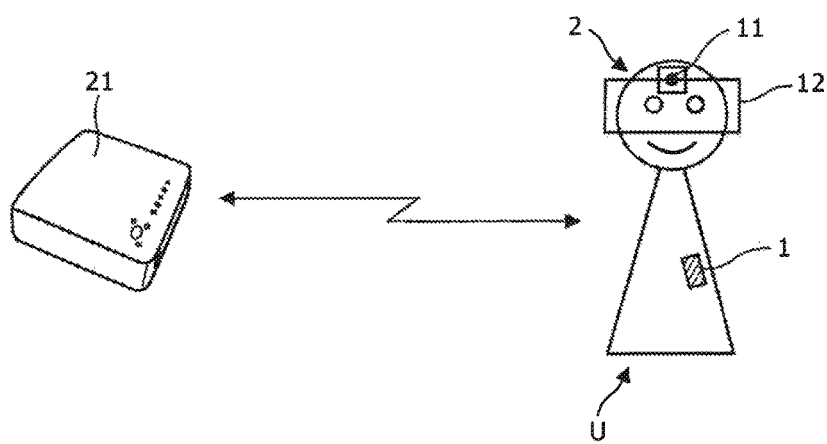
FIG. 1 is a diagram illustrating an example of appearance of an MR system using an information processor according to an embodiment of the present invention.

FIG. 1 is a diagram illustrating an example of appearance of an MR system using an information processor according to an embodiment of the present invention.

As illustrated in FIG. 1, a user U carries an information processor 1 which is a portable computer. The user U also wears a head mounted display (HMD) 2. The information processor 1 and HMD 2 can communicate with each other in a wired or wireless fashion.

The HMD 2 has a camera 11 and display 12.

The camera 11 is attached where it can capture the scene in front of the user U wearing the HMD 2. The capture range of the camera 11 includes the line of sight of the user U. The image captured by the camera 11 is transmitted to the information processor 1. The camera 11 continues to capture images (moving images) at a predetermined frame rate. This allows for images of the scene seen by the user U to be supplied to the information processor 1.

A display 12 is attached in front of the eyes of the user U wearing the HMD 2. The display 12 includes a transparent member and displays, for example, an image based on data transmitted from the information processor 1. The user U can see the scene beyond the display 12. The user U can also see the image shown on the display 12.

For example, the information processor 1 carried by the user U recognizes the object seen by the user U to determine what the object is based on the image captured by the camera 11. The information processor 1 stores object recognition data adapted to recognize the object seen by the user U. The object recognition data includes data representing the appearance features of a target device 21 extracted from the appearance image of the target device 21.

That is, the image captured by the camera 11 includes the line of sight of the user U. Therefore, object recognition is conducted assuming that the object included in the image captured by the camera 11 is the object seen by the user U.

Further, if the information processor 1 detects that the user U is looking at the target device 21, an operation image such as button is displayed on the display 12 based on GUI (Graphical User Interface) data of the target device 21. The information processor 1 stores the GUI data in association with various devices including the target device 21. The GUI data is designed to display operation images that are used for operation of the devices.

Figure 2:
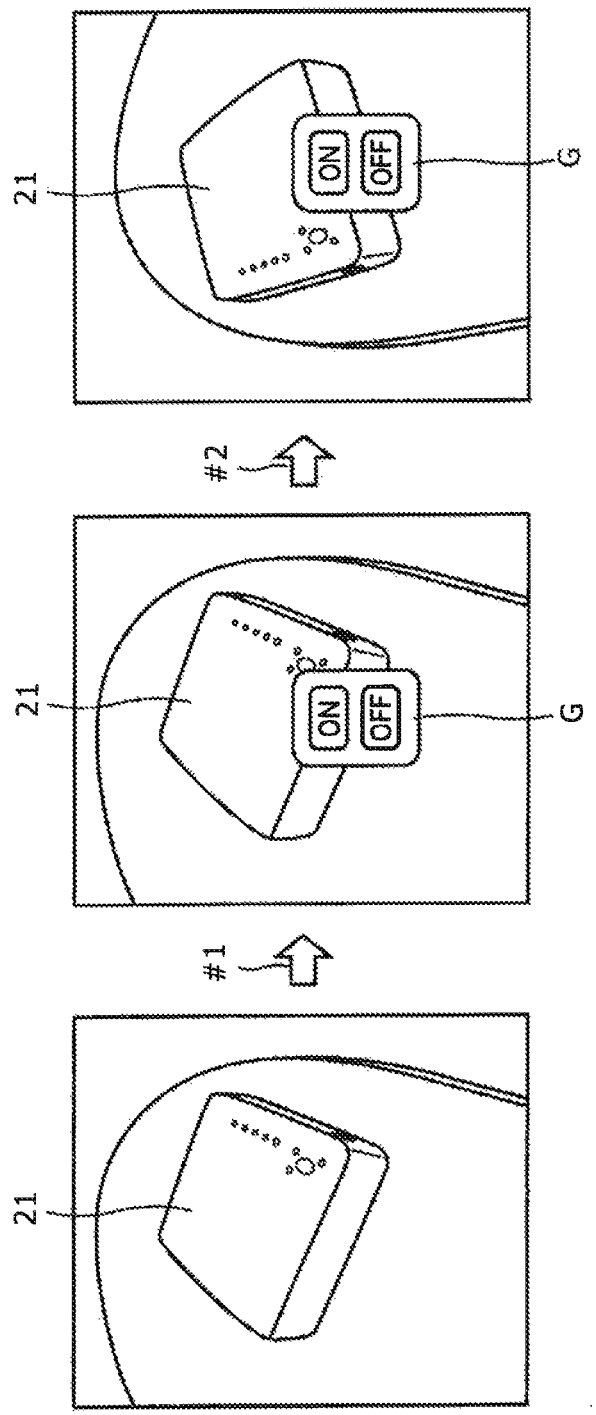
FIG. 2 is a group of diagrams illustrating an example of what the user wearing an HMD 2 sees.

FIG. 2 is a group of diagrams illustrating an example of what the user wearing the HMD 2 sees.

In the example shown in FIG. 2, the vision of the user U is enclosed by a box. In reality, however, the user U sees a wider scene than that shown in FIG. 2.

As shown in the left figure of FIG. 2, the target device 21 is on a table slightly at a distance from the user U. Immediately after looking at the target device 21, the user U sees only the scene in front of him or her beyond the display 12 because no image is shown on the display 12. The scene as illustrated in the left figure of FIG. 2 is captured by the camera 11.

If it is detected based on the image captured by the camera 11 that the user U is looking at the target device 21, the operation image used for operation of the target device 21 is shown on the display 12. What the user U sees when the operation image is shown on the display 12 is illustrated in the figure pointed to by outlined arrow #1.

In the example illustrated in FIG. 2, an operation image G includes an ON button and OFF button. The ON button is operated to turn ON the power. The OFF button is operated to turn OFF the power. The images of the ON and OFF buttons are displayed in the same color.

The operation image G is displayed on the display 12 with a predetermined transparency. The display surface of the display 12 is located closer to the eye position than the target device 21. Therefore, as far as what the user U sees is concerned, the operation image G appears as if the buttons are located more forward than the target device 21. The operation image G is displayed at the position of the display 12 where the image G appears to overlap the target device 21.

If, in this condition, the user U moves while looking at the target device 21, the operation image G remains face to face with the user U without changing its shape or orientation and is displayed at different positions so as to appear to overlap the target device 21 in response to the change in what the user U sees. What the user U sees when the target device 21 is viewed from different angles is illustrated in the figure pointed to by outlined arrow #2.

The user U can operate the target device 21 by virtually pressing the buttons in the operation image G shown on the display 12 as described above.

Figure 3:
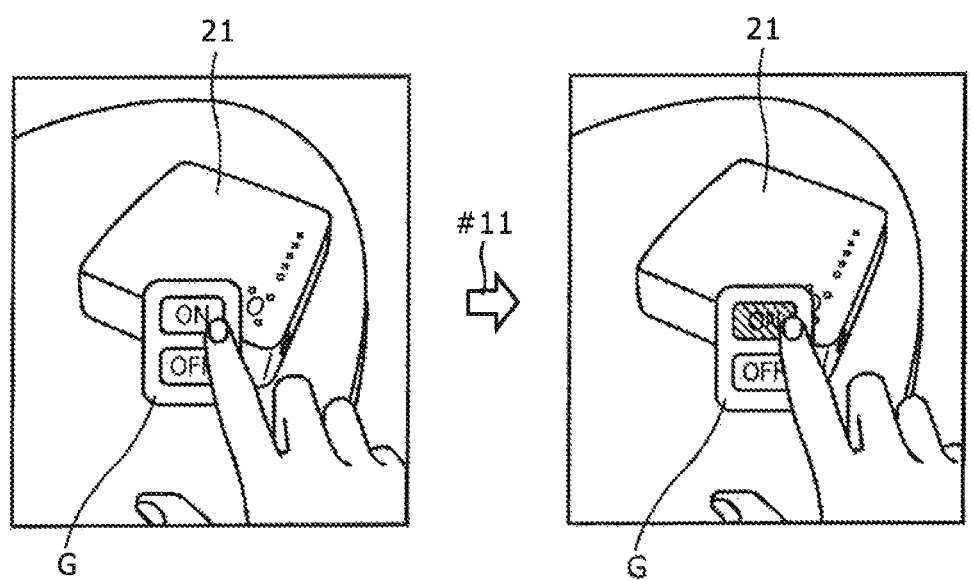
FIG. 3 is a group of diagrams illustrating an example of what the user sees when he or she operates a button.

FIG. 3 is a group of diagrams illustrating an example of what the user U sees when he or she operates one of the buttons.

The information processor 1 is capable of recognizing the finger of the user U. For example, if the user U makes a motion such as placing his or her finger on the ON button in the operation image G and pressing in the same button as shown in the left figure of FIG. 3, the information processor 1 determines that the ON button has been pressed. The information processor 1 controls the display of the operation image G so that the ON button changes its color as illustrated in the figure pointed to by arrow #11. The ON button in the operation image G shown in the right figure of FIG. 3 is shaded to indicate that the button has changed its color.

It should be noted that the display surface of the display 12 is located closer to the eye position than the finger of the user U. In reality, therefore, the finger of the user U is not placed on the button.

As described later, the information processor 1 determines that the finger of the user is placed on the button when the finger position in the image captured by the camera 11 is corresponding to the position where the button is displayed on the display 12. Further, if, in this condition, the size of the finger in the image captured by the camera 11 becomes smaller, the information processor 1 determines that the button has been pressed.

When determining that the button has been pressed, the information processor 1 transmits a command to the target device 21 through wireless communication to instruct the execution of the process assigned to the button. In response to the command, the target device 21 performs the process appropriate to the command.

This allows for the user U to display the buttons adapted to operate a device by looking at the device even if the device is located at a distance. Further, the user U can operate the device using the displayed buttons. That is, the user U can operate the device with ease without looking for the switches adapted to operate the device or holding the remote controller in his or her hand.

So long as recognition data used for object recognition and GUI data are available, any kind of device can be operated.

Figure 4:
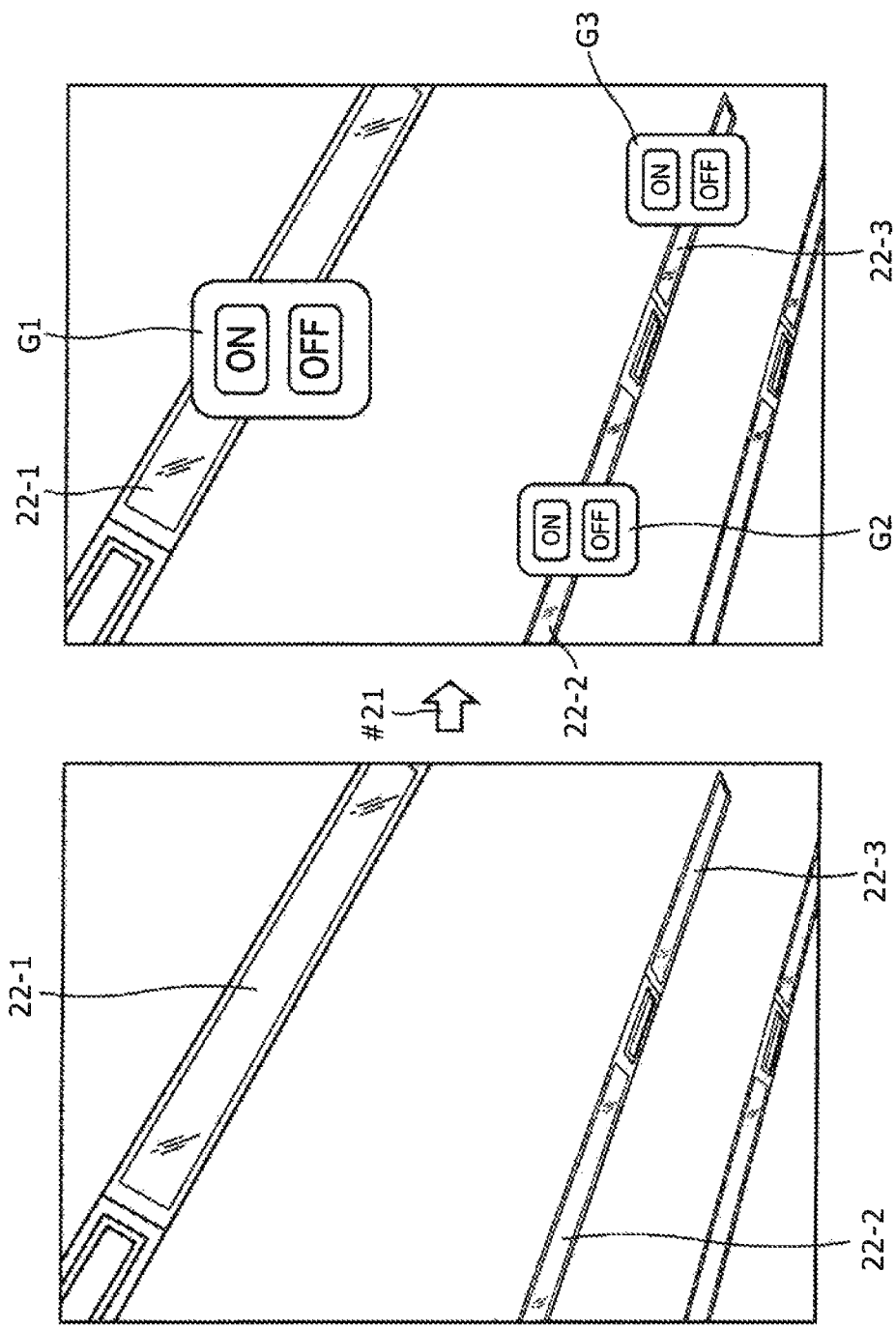
FIG. 4 is a group of diagrams illustrating an example of display of operation images.

FIG. 4 is a group of diagrams illustrating an example of display of operation images used for operation of lighting devices embedded in the ceiling of a room which are different from the target device 21.

A description will be given below of a case in which recognition data and GUI data for lighting devices 22-1 to 22-3 shown in the left figure of FIG. 4 are available in the information processor 1. The lighting devices 22-1 to 22-3 have, for example, the same product number. If the target devices are the same in type, only a set of recognition data and GUI data is required.

When it is determined based on the image captured by the camera 11 that the user U is looking at the lighting devices 22-1 to 22-3, operation images G1 to G3 are displayed in such a manner as to overlap the lighting devices 22-1 to 22-3 as illustrated in the figure pointed to by arrow #21.

The operation images may change in size according to the distance between the target devices and user U. In the example shown in FIG. 4, the operation image G1 used for operation of the lighting device 22-1 is displayed larger than the operation images G2 and G3 used respectively for operation of the lighting devices 22-2 and 22-3 that are located farther from the user U.

The user U can operate the lighting device 22-1 by virtually pressing the buttons in the operation image G1. Similarly, the user U can operate the lighting device 22-2 by virtually pressing the buttons in the operation image G2. Still similarly, the user U can operate the lighting device 22-3 by virtually pressing the buttons in the operation image G3.

A description will be given later of a series of processes performed by the information processor 1 to display the operation images and control the target devices as described above.

[Configuration of the Information Processor]

FIG. 5 is a block diagram illustrating an example of hardware configuration of the information processor 1.

A CPU (Central Processing Unit) 31, ROM (Read Only Memory) 32 and RAM (Random Access Memory) 33 are connected to each other via a bus 34.

An I/O interface 35 is also connected to the bus 34. An input section 36, output section 37, storage section 38, communication section 39 and drive 40 are connected to the I/O interface 35.

The input section 36 communicates with the HMD 2 and receives images captured by the camera 11 of the HMD 2.

The output section 37 transmits display data to the HMD 2 and displays operation images on the display 12.

The storage section 38 includes, for example, a hard disk or non-volatile memory and stores recognition data and GUI data for target devices.

The communication section 39 includes, for example, a network interface such as wireless LAN (Local Area Network) module and communicates with servers connected via networks. Recognition data and GUI data for target devices stored in the storage section 38 are, for example, downloaded from a server and supplied to the information processor 1.

The drive 40 reads data from a removable medium 41 loaded in the drive 40 and writes data to the removable medium 41.

Figure 6:
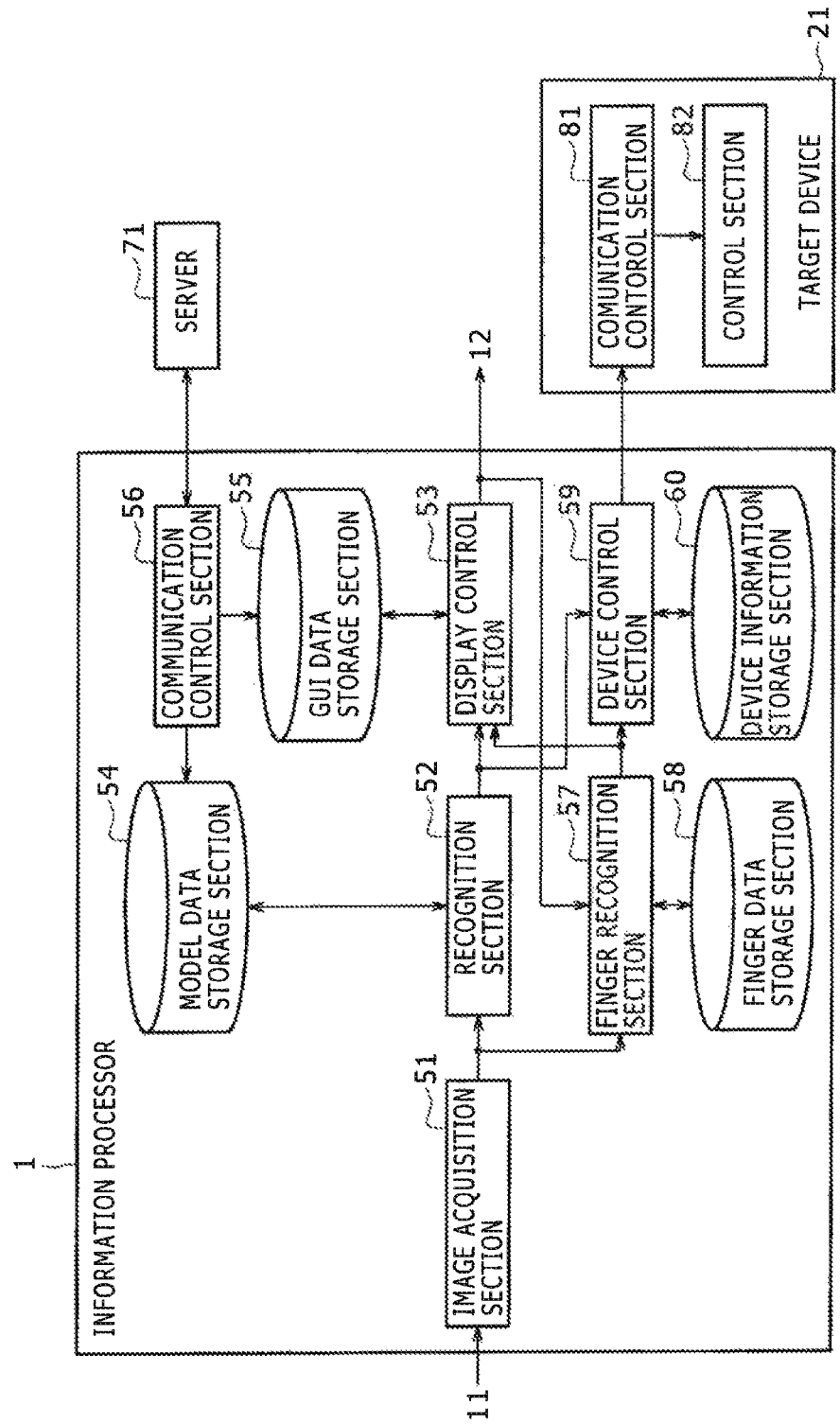
FIG. 6 is a block diagram illustrating an example of functional configuration of the information processor.

FIG. 6 is a block diagram illustrating an example of functional configuration of the information processor 1.

An image acquisition section 51, recognition section 52, display control section 53, model data storage section 54, GUI data storage section 55, communication control section 56, finger recognition section 57, finger data storage section 58, device control section 59 and device information storage section 60 are materialized in the information processor 1.

At least some of the sections shown in FIG. 6 are implemented as a result of execution of a predetermined program by the CPU 31 shown in FIG. 5. The model data storage section 54, GUI data storage section 55, finger data storage section 58 and device information storage section 60 are formed, for example, as the storage section 38.

The image acquisition section 51 acquires an image, captured by the camera 11, that has been received by the input section 36. The image acquisition section 51 outputs the acquired image to the recognition section 52 and finger recognition section 57.

The recognition section 52 receives the image from the image acquisition section 51 as a query image and recognizes the object included in the image based on model data stored in the model data storage section 54. The model data storage section 54 stores data representing the features of the target devices extracted from the image including the appearances of the target devices. The object recognition performed by the recognition section 52 will be described later.

The recognition section 52 outputs, for example, the ID of the recognized object (target device) and posture information representing the relative positional relationship between the recognized object and camera 11 (user U) to the display control section 53 as a recognition result. For example, the distance to and the direction of the user U from the recognized target device are identified based on the posture information. The ID of the target device is also supplied to the device control section 59.

The display control section 53 reads the GUI data from the GUI data storage section 55. The GUI data is associated with the ID supplied from the recognition section 52. Further, the display control section 53 controls the output section 37 shown in FIG. 5 to transmit the GUI data to the HMD 2 so that the operation images are displayed on the display 12. The GUI data storage section 55 stores the IDs of the target devices and the GUI data in association with each other. The GUI data output from the display control section 53 is also supplied to the finger recognition section 57.

Further, if a button ID is supplied from the finger recognition section 57 in response to the pressing of a button displayed on the display 12, the display control section 53 controls the display of the operation image, for example, by changing the color of the pressed button.

The communication control section 56 controls the communication section 39 to communicate with a server 71 and downloads model data used for recognition of the target device and GUI data for the target device. The server 71 is, for example, managed by the manufacturer that manufactures and sells the target device and has databases for the model data and GUI data. The communication control section 56 stores the downloaded model data in the model data storage section 54 and the downloaded GUI data in the GUI data storage section 55.

The finger recognition section 57 recognizes the position and size of the finger of the user U included in the image supplied from the image acquisition section 51 based on the data stored in the finger data storage section 58. The finger data storage section 58 stores information such as finger color and outline as finger recognition data.

When determining, based on the recognized position and size of the finger of the user U, that the button displayed on the display 12 has been pressed, the finger recognition section 57 outputs the button ID, i.e., identification information of the button that has been pressed, to the display control section 53 and device control section 59. Each of the buttons displayed as an operation image is assigned an ID. The position where each button is displayed on the display 12 is identified based on the GUI data supplied from the display control section 53.

When a button ID is supplied from the finger recognition section 57, the device control section 59 reads a command from the device information storage section 60. This command instructs the execution of the process assigned to the pressed button. The device information storage section 60 stores the IDs of the target devices and the information relating to the target devices such as commands and network addresses in association with each other.

The device control section 59 controls, for example, the communication section 39 to communicate with the target device 21 and transmit the command, read from the device information storage section 60, to the target device 21.

A communication control section 81 and control section 82 are implemented in the target device 21 as illustrated in FIG. 6.

The communication control section 81 receives a command from the information processor 1 and outputs the command to the control section 82.

The control section 82 controls the various sections of the target device 21 according to the command supplied from the communication control section 81 to perform the process whose execution is instructed by the command.

Figure 7:
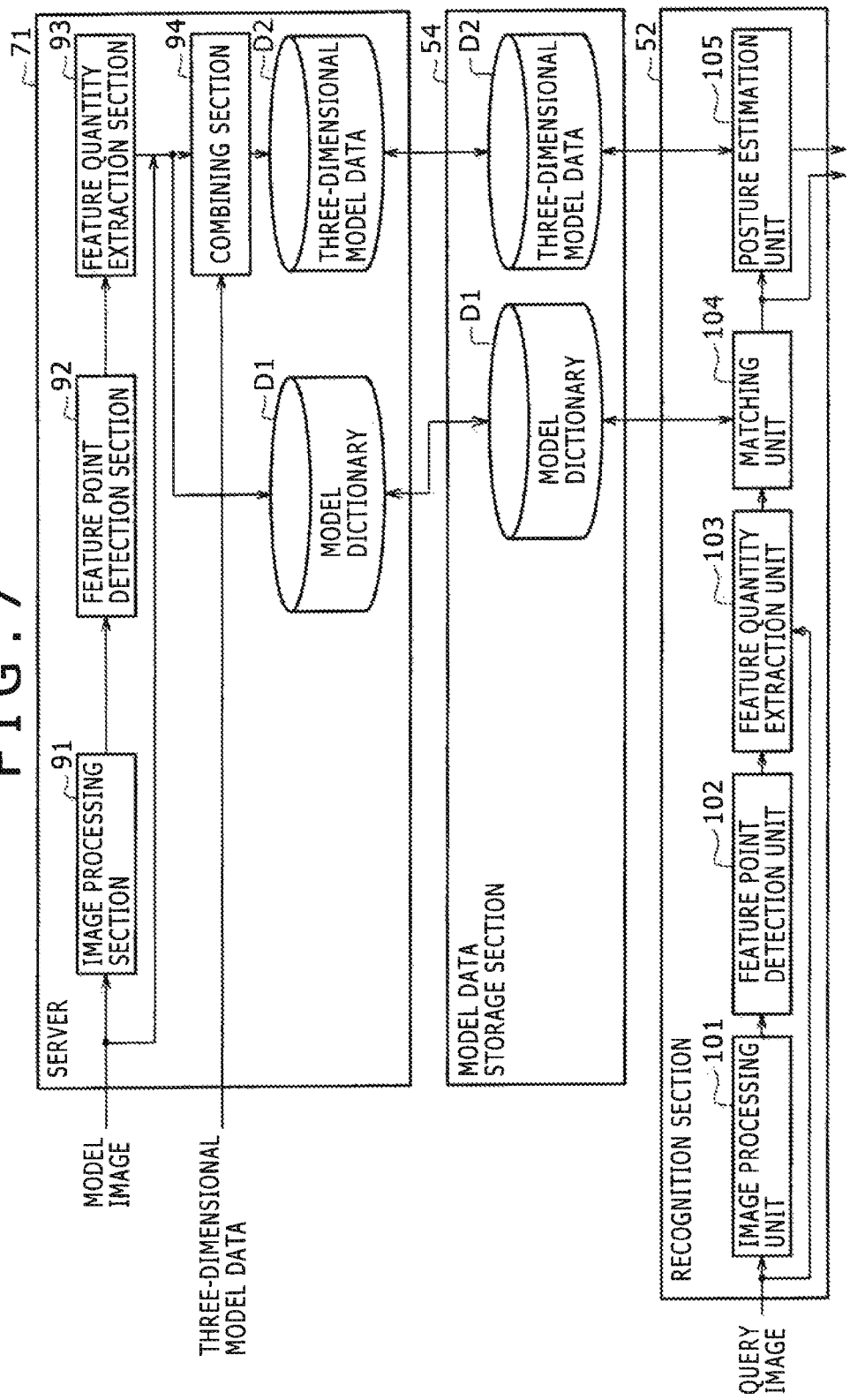
FIG. 7 is a diagram describing object recognition.

FIG. 7 is a diagram describing object (target device) recognition.

Among the algorithms used by the recognition section 52 are RandomizedFern and SIFT (Scale Invariant Feature Transform. RandomizedFern is disclosed in "Fast Keypoint Recognition using Random Ferns Mustafa Ozuysal, Michael Calonder, Vincent Le Petite and Pascal FuaEcole Polytechnique Federale de Lausanne (EPEL) Computer Vision Laboratory, & C Faculty CH-1015 Lausanne, Switzerland." On the hand, SIFT is disclosed in "Distinctive Image Features from Scale-Invariant Keypoints David G. Lowe Jan. 5, 2004."

As illustrated in FIG. 7, an image processing section 91, feature point detection section 92, feature quantity extraction section 93 and combining section 94 are materialized in the server 71 which is a learning device. All the sections shown in FIG. 7 are materialized as a result of execution of a predetermined program by the CPU of the server 71. The server 71 also includes a computer as shown in FIG. 5.

The image processing section 91 applies affine transform or other process to a model image and outputs the resultant model image to the feature point detection section 92. An appearance image of each of the target devices is sequentially fed to the image processing section 91 as model images. The model images are also fed to the feature quantity extraction section 93.

The feature point detection section 92 determines the points in the model image, supplied from the image processing section 91, as model feature points and outputs the information representing the positions of the model feature points to the feature quantity extraction section 93.

The feature quantity extraction section 93 extracts, as model feature quantities, information of the pixels whose positions are corresponding to the positions of the model feature points from among the pixels making up the model image. The model feature quantity data extracted by the feature quantity extraction section 93 is registered in a model dictionary D1 in association with the ID of the target device included in the model image from which the feature quantity was extracted. The model dictionary D1 includes data that associates the ID of the target device with the model feature quantity data for each of the model feature points extracted from the image including the target device.

Further, the feature quantity extraction section 93 outputs the extracted model feature quantity data to the combining section 94.

The combining section 94 combines input three-dimensional model data and model feature quantity data supplied from the feature quantity extraction section 93. Data that represents the form of three-dimension corresponding to each target devices is input as three-dimensional model data to the combining section 94.

For example, the combining section 94 calculates, based on the three-dimensional model data, the position on the three-dimensional model of each of the model feature points when the target device is viewed from various angles. The combining section 94 assigns the model feature quantity data to each of the calculated positions of the model feature points, thus combining the three-dimensional model data and model feature quantity data and generating three-dimensional model data D2.

The model dictionary D1 and three-dimensional model data D2 generated by the combining section 94 are supplied to the information processor 1 and stored in the model data storage section 54.

As illustrated in FIG. 7, the recognition section 52 includes an image processing unit 101, feature point detection unit 102, feature quantity extraction unit 103, matching unit 104 and posture estimation unit 105. An image captured by the camera 11 and acquired by the image acquisition section 51 is fed to the image processing unit 101 as a query image. This query image is also supplied to the feature quantity extraction unit 103.

The image processing unit 101 applies affine transform or other process to the query image and outputs the resultant query image to the feature point detection unit 102 as does the image processing section 91.

The feature point detection unit 102 determines the points in the query image, supplied from the image processing unit 101, as query feature points and outputs the information representing the positions of the query feature points to the feature quantity extraction unit 103.

The feature quantity extraction unit 103 extracts, as query feature quantities, information of the pixels whose positions are corresponding to the positions of the query feature points from among the pixels making up the query image. The feature quantity extraction unit 103 outputs the extracted query feature quantity data to the matching unit 104.

The matching unit 104 performs a K-NN search or other nearest neighbor search based on the feature quantity data included in the model dictionary D1, thus determining the model feature point that is the closest to each query feature point. The matching unit 104 selects, for example, the target device having the largest number of closest model feature points based on the number of model feature points closest to the query feature points. The matching unit 104 outputs the ID of the selected target device as a recognition result.

The ID of the target device output from the matching unit 104 is supplied not only to the display control section 53 and device control section 59 shown in FIG. 6 but also to the posture estimation unit 105. The posture estimation unit 105 is also supplied with information representing the position of each of the query feature points.

The posture estimation unit 105 reads the three-dimensional model data D2 of the target device recognized by the matching unit 104 from the model data storage section 54. The posture estimation unit 105 identifies, based on the three-dimensional model data D2, the position on the three-dimensional model of the model feature point closest to each of the query feature points. The posture estimation unit 105 outputs posture information representing the positional relationship between the target device and user U.

If the position on the three-dimensional model of the model feature point closest to each of the query feature points, detected from the query image captured by the camera 11, can be identified, it is possible to determine from which position of the target device the query image was captured, i.e., where the user U is.

Further, if the size of and distance to the target device included in the image are associated with each other in advance, it is possible to determine, based on the size of the target device included in the query image captured by the camera 11, the distance from the target device to the user U.

The relative positional relationship between the target device looked by the user U and the user U is recognized as described above.

The three-dimensional model data D2 contains information of each of the model feature points obtained when the target device is viewed from various angles. Object recognition using the three-dimensional model data D2 makes it possible to identify the target device included in an image by using the image as a query image no mater from which direction the image of the target device was captured.

It should be noted that not only an image captured by a monocular camera but also that captured by a stereo camera may be used as a query image for object recognition.

[Operation of the Information Processor]

Figure 8:
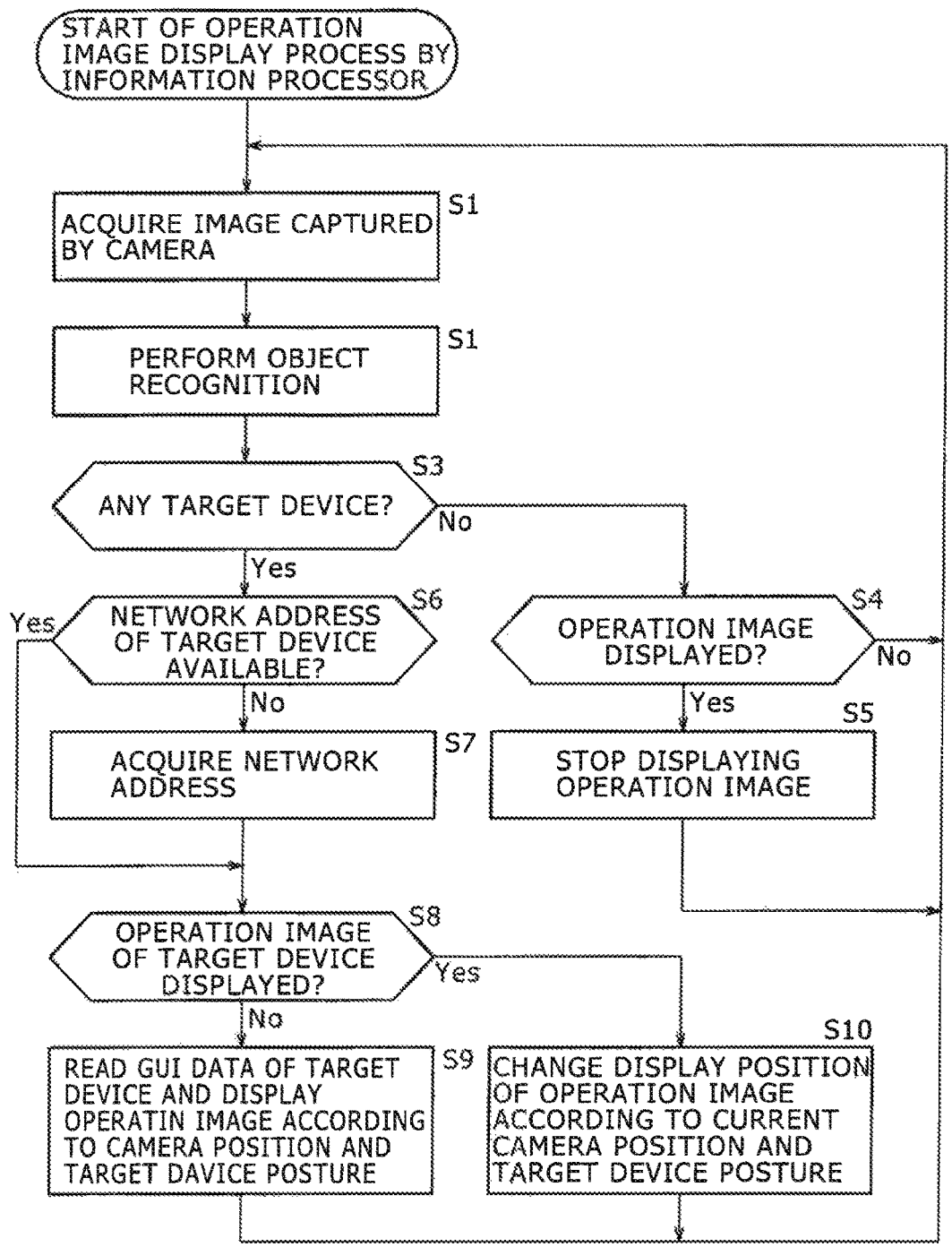
FIG. 8 is a flowchart describing an operation image display process performed by the information processor.

A description will be given here of the process performed by the information processor 1 adapted to display operation images with reference to the flowchart shown in FIG. 8. The process shown in FIG. 8 is repeated, for example, during image capture by the camera 11.

In step S1, the image acquisition section 51 acquires an image captured by the camera 11.

In step S2, the recognition section 52 performs object recognition in the image acquired by the image acquisition section 51.

In step S3, it is determined whether the target device is included in the image captured by the camera 11, that is, whether the user U is looking at the target device.

If it is determined in step S3 that the user U is not looking at the target device, the display control section 53 determines in step S4 whether an operation image is displayed on the display 12.

If it is determined in step S4 that an operation image is displayed on the display 12, the display control section 53 stops displaying an operation image. When the display of an operation image is stopped, or when it is determined in step S4 that no operation image is displayed, the process returns to step S1 to repeat the process steps that follow.

On the other hand, when it is determined in step S3 that the user U is looking at the target device, the device control section 59 determines in step S6 whether the network address of the target device at which the user U is looking is available. When it is determined in step S3 that the user U is looking at the target device, the recognition section 52 supplies the ID of the target device to the device control section 59. The device control section 59 searches the device information storage section 60, thus verifying whether the network address is stored in association with the ID of the target device.

If it is determined in step S6 that the network address of the target device is not available, the device control section 59 controls the communication section 39, for example, to make an inquiry to an unshown router device in step S7, thus acquiring the network address of the target device. The device control section 59 stores the acquired network address in the device information storage section 60 in association with the ID of the target device. The network address is used to transmit a command to the target device by way of a network.

When it is determined in step S6 that the network address of the target device at which the user U is looking is available because the network address is already stored in the device information storage section 60, the process step in step S7 is skipped.

The display control section 53 determines in step S8 whether the operation image of the target device at which the user U is looking is displayed on the display 12.

If it is determined in step S8 that the operation image of the target device is not displayed, the display control section 53 reads the GUI data of the target device from the GUI data storage section 55 and displays the operation image on the display 12. The operation image is displayed on the display 12 to face the user U according to the position of the camera 11 and the posture of the target device.

On the other hand, when it is determined in step S8 that the operation image of the target device is displayed, the display control section 53 changes the display position of the operation image on the display 12 according to the current position of the camera 11 and the current posture of the target device in step S10.

When the display of the operation image begins in step S9 or when the display position of the operation image is changed in step S10, the process returns to step S1 to repeat the process steps that follow.

FIG. 9 is a group of diagrams describing the display position of the operation image.

The top image of FIG. 9 is captured by the camera 11 and includes the target device 21. The position of the target device 21 in the image (e.g., center position of the area of the target device 21) is represented by a position p1.

The middle image of FIG. 9 shows the display area of the display 12. The position of each pixel making up the display area of the display 12 is associated with the position of one of the pixels of the image captured by the camera 11. The operation image G is displayed so that the center of the operation image G, for example, matches a position p11. The position p11 is the position of the target device 21 on the display 12 and is corresponding to the position p1 that is the position of the target device 21 in the image captured by the camera 11.

As a result, the operation image G appears to overlap the target device 21 when seen by the user U as illustrated in the bottom image of FIG. 9.

If the position and posture of the target device 21 move in the image captured by the camera 11 in response to the movement of the user U, the display of the operation image G is updated so that the center of the operation image G, for example, continues to match the position of the target device 21 on the display 12 that is corresponding to the position of the target device 21 in the image.

Figure 10:
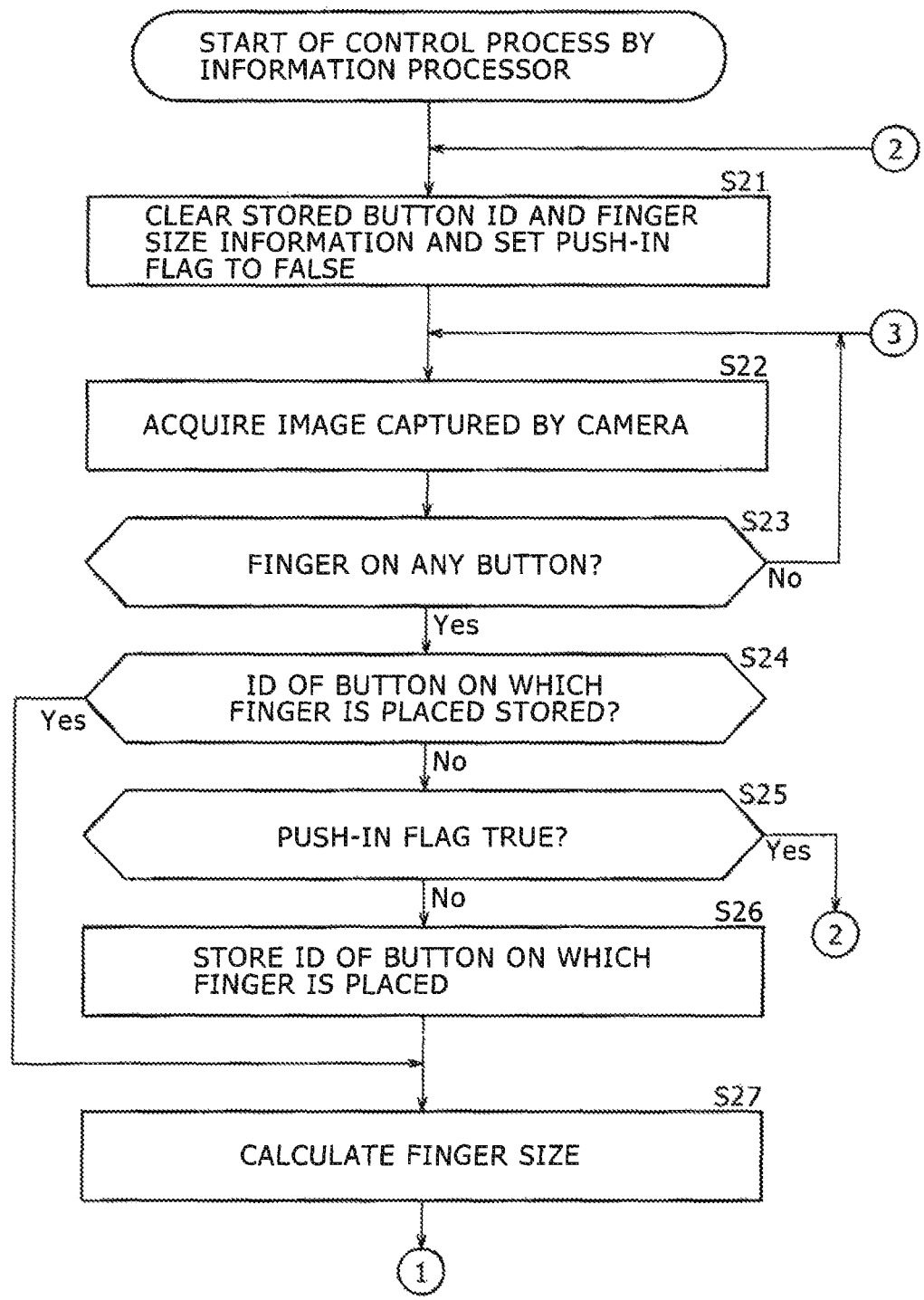
FIG. 10 is a flowchart describing a control process performed by the information processor.
Figure 11:
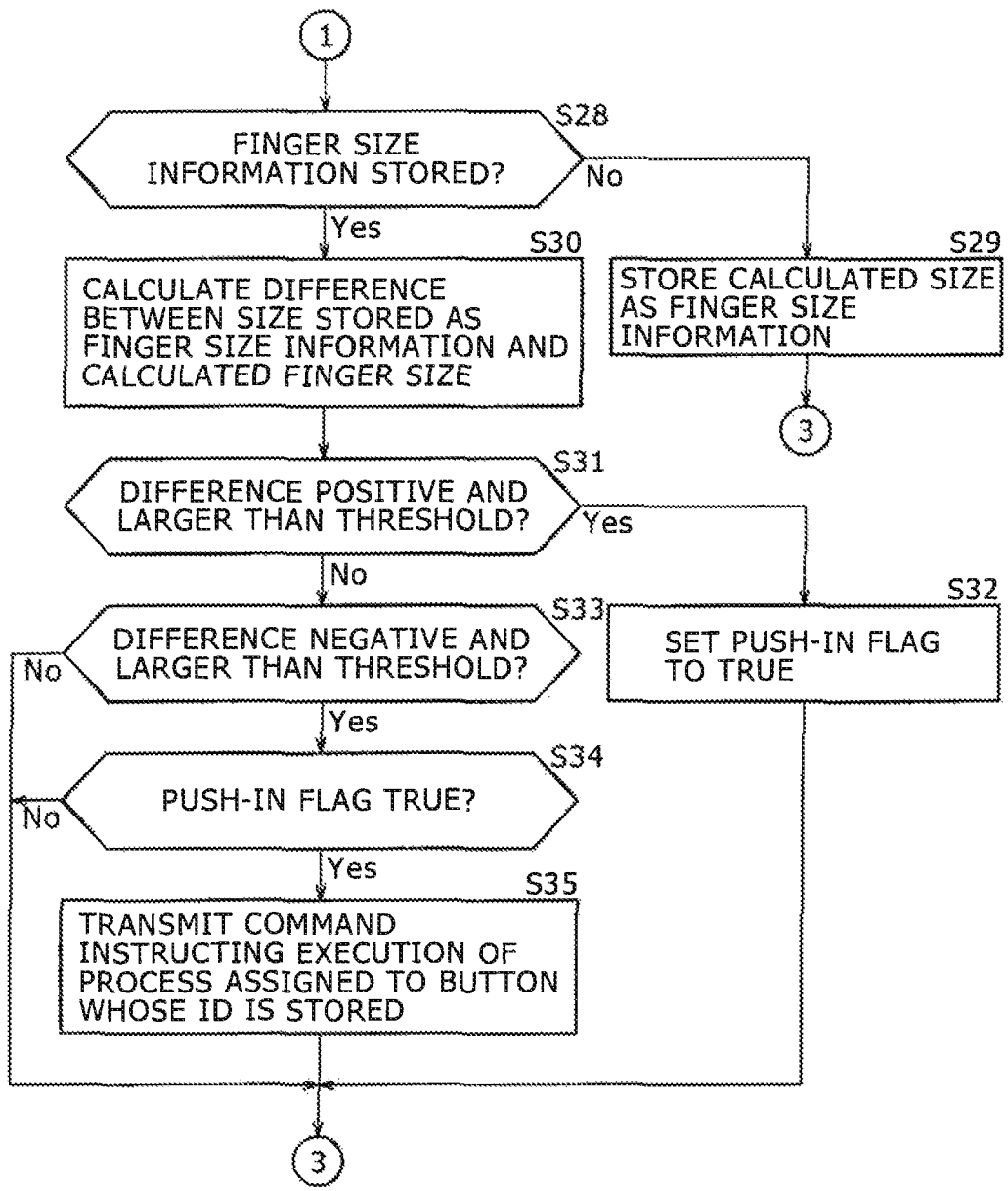
FIG. 11 is a flowchart continued from FIG. 10 describing the control process performed by the information processor.

A description will be given next of the process performed by the information processor 1 adapted to control the target device with reference to the flowcharts shown in FIGS. 10 and 11. The process shown in FIGS. 10 and 11 is repeated, for example, while the operation image is displayed on the display 12.

In step S21, the finger recognition section 57 clears the button ID and finger size information from the finger data storage section 58 and sets a press-in flag to false for initialization.

The button ID is an ID assigned to the button displayed on the display 12 as an operation image. The ID of the button on which the finger of the user U is placed, for example, is stored in the finger data storage section 58.

Finger size information represents the size of the finger included in the image captured by the camera 11. The finger size is represented, for example, by the pixel count in the finger area included in the image captured by the camera 11.

The press-in flag represents whether the user U is pressing in the button with his or her finger. The fact that the press-in flag is set to true indicates that the button is being pressed in. On the other hand, the fact that the press-in flag is set to false means that the button is not being pressed in.

In step S22, the image acquisition section 51 acquires an image captured by the camera 11.

In step S23, the finger recognition section 57 recognizes the position of the finger of the user U based on the image supplied from the image acquisition section 51. The finger recognition section 57 determines whether the finger is placed on either of the buttons displayed as an operation image.

For example, it is determined that the finger is placed on either of the buttons when the finger position (e.g., finger tip) on the display 12 corresponding to the finger position in the image captured by the camera 11 is located within the display area of the button.

If it is determined in step S23 that the finger is not placed on either of the buttons, the process returns to step S22 to repeat the process steps that follow.

On the other hand, when it is determined in step S23 that the finger is placed on either of the buttons, the finger recognition section 57 determines in step S24 whether the ID of the button on which the finger is placed is stored in the finger data storage section 58.

If it is determined in step S24 that the ID of the button on which the finger is placed is not stored in the finger data storage section 58, the finger recognition section 57 determines in step S25 whether the press-in flag is set to true.

If it is determined in step S25 that the press-in flag is set to true, the process returns to step S21 to repeat the process steps that follow. If, as a result of the sliding of the finger sideways after pressing in the button, the button on which the finger was placed and which was pressed in immediately prior to the determination differs from the button on which the finger is being placed, it is determined that the press-in flag is set to true.

When the finger recognition section 57 determines in step S25 that the press-in flag is not set to true because the press-in flag is set to false, the finger recognition section 57 stores the ID of the button on which the finger is placed in the finger data storage section 58 in step S26.

When it is determined in step S24 that the ID of the button on which the finger is placed is stored in the finger data storage section 58, the process steps in steps S25 and S26 are skipped.

In step S27, the finger recognition section 57 calculates the finger size based on the pixel count in the finger area included in the image captured by the camera 11 and other data.

In step S28, the finger recognition section 57 determines whether finger size information is stored in the finger data storage section 58.

If it is determined in step S28 that finger size information is not stored in the finger data storage section 58, the finger recognition section 57 stores finger size information representing the size calculated in step S27 in the finger data storage section 58. Then, the process returns to step S22 to repeat the process steps that follow.

On the other hand, when it is determined in step S28 that finger size information is stored in the finger data storage section 58, the finger recognition section 57 calculates the difference between the size represented by the finger size information stored in the finger data storage section 58 and the calculated size in step S30.

The finger size information stored in the finger data storage section 58 represents the finger size calculated from the image captured earlier by the camera 11. On the other hand, the size calculated in step S27 represents the finger size calculated from the image captured later (at present) by the camera 11.

Figure 12A:
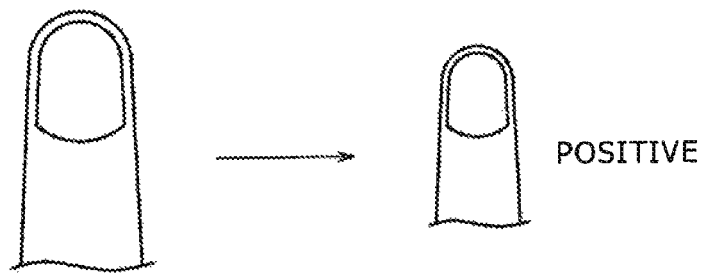
FIGS. 12A and 12B are diagrams illustrating examples of the change in size of a finger.

Therefore, the fact that the difference between the earlier and later finger sizes is positive means that the finger size has become smaller in the image captured by the camera 11 as illustrated in FIG. 12A, that is, the user U pressed in the button.

Figure 12B:
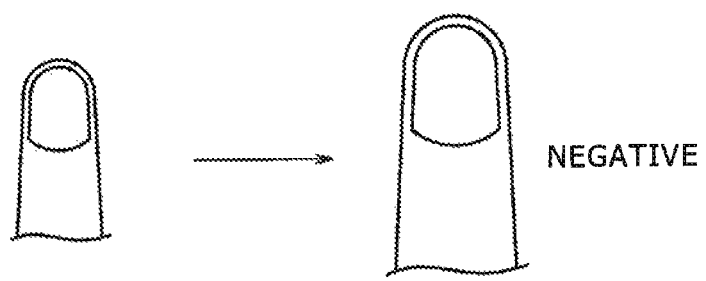

On the other hand, the fact that the difference between the earlier and later finger sizes is negative means that the finger size has become larger in the image captured by the camera 11 as illustrated in FIG. 12B, that is, the user U released the button from its pressed-in position. The difference between the earlier and later finger sizes will be hereinafter referred to as a finger size difference as appropriate.

Referring back to the description of FIG. 11, the finger recognition section 57 determines in step S31 whether the finger size difference calculated in step S30 is positive and larger than a threshold.

When it is determined in step S31 that the finger size difference is positive and larger than the threshold, the finger recognition section 57 sets the press-in flag to true in step S32. When the button is pressed in by as much as or more than the threshold, the press-in flag is set to true. Then, the process returns to step S22 to repeat the process steps that follow.

On the other hand, if it is determined in step S31 that the finger size difference is negative or smaller than the threshold although being positive, the finger recognition section 57 determines in step S33 whether the finger size difference is negative and whether the absolute value of the finger size difference is larger than the threshold.

When it is determined in step S33 that the finger size difference is negative and that the absolute value of the finger size difference is larger than the threshold, the finger recognition section 57 determines whether the press-in flag is set to true.

When it is determined in step S34 that the press-in flag is set to true, the device control section 59 reads a command from the device information storage section 60 in step S35. This command instructs the execution of the process assigned to the button identified by the button ID. When it is determined in step S34 that the press-in flag is set to true, the button ID stored in the finger data storage section 58 is supplied to the device control section 59. Further, the device control section 59 transmits the command, read from the device information storage section 60, to the target device 21.

It is determined that the finger size difference is negative, that the absolute value of the finger size difference is larger than the threshold, and that the press-in flag is set to true when, after the button has been pressed in with the finger placed on the button, the button is released from its pressed-in position by as much as or more than the threshold.

Conceptually speaking, the command is transmitted when the button is released after having been virtually pressed in. The command may be transmitted simply when the button is virtually pressed in.

If the command is transmitted in step S35, the process returns to step S22 to perform the process steps that follow. If it is determined in step S33 that the finger size difference is negative and that the absolute value of the finger size difference is not larger than the threshold, or if it is determined in step S34 that the press-in flag is not set to true, the process steps from step S22 and beyond are performed.

Figure 13:
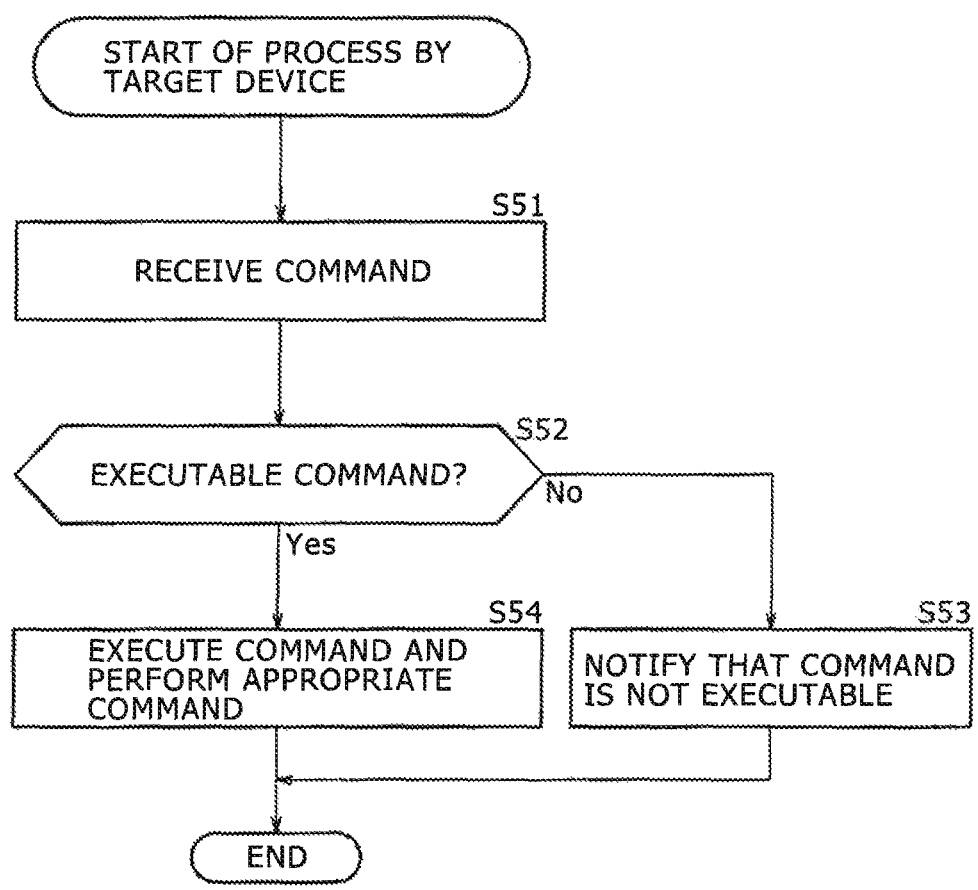
FIG. 13 is a flowchart describing a process performed by the target device.

A description will be given next of the process performed by the target device 21 adapted to receive a command from the information processor 1 with reference to the flowchart shown in FIG. 13.

In step S51, the communication control section 81 of the target device 21 receives a command from the information processor 1. The command received by the communication control section 81 is supplied to the control section 82.

In step S52, the control section 82 determines whether the command transmitted from the information processor 1 is executable.

If it is determined in step S52 that the command is not executable, the control section 82 controls the communication control section 81 in step S53 to transmit information to the information processor 1 to inform that the command is not executable.

On the other hand, when it is determined in step S52 that the command is executable, the control section 82 executes the command to perform the appropriate process in step S54. For example, when a command is transmitted from the information processor 1 in response to the pressing of the ON button shown in FIG. 3, the power for the target device 21 is turned on for activation as a process appropriate to the command.

The above process makes it possible for the user U to remotely operate the target device with more ease.

Modification Example

The display of an operation image may be customizable according to the preference of the user U.

Figure 14:
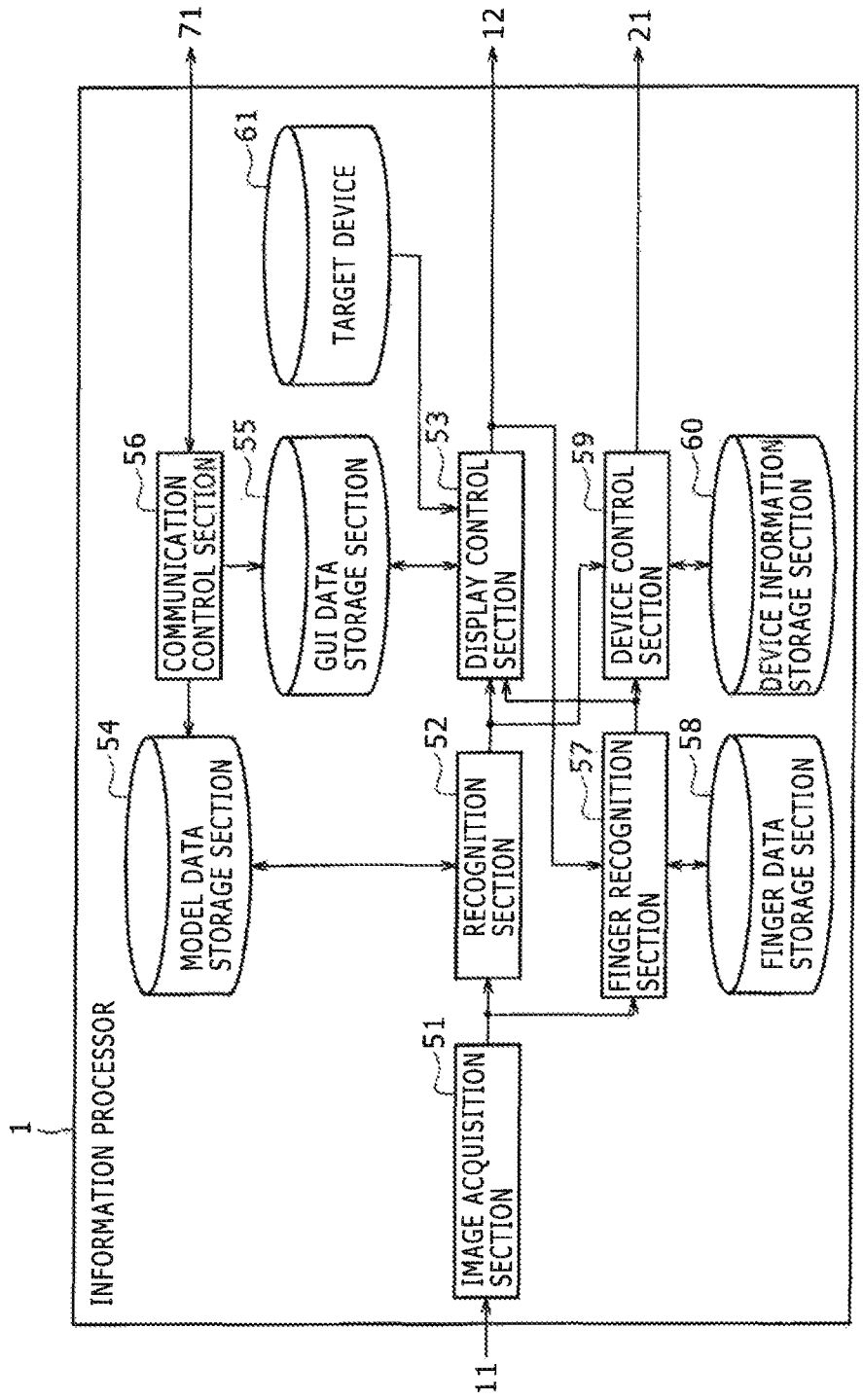
FIG. 14 is a block diagram illustrating another example of functional configuration of the information processor.

FIG. 14 is a block diagram illustrating another example of functional configuration of the information processor 1.

In FIG. 14, like sections to those shown in FIG. 6 are denoted by the same reference numerals, and the description is omitted as appropriate to avoid redundancy. The configuration shown in FIG. 14 differs from that shown in FIG. 6 in that a setting information storage section 61 is added.

The setting information storage section 61 stores setting information that represents the details of settings related to the display of an operation image that have been entered by the user U. Entry of settings related to the display of an operation image is also made, for example, by using virtual buttons as with the operation of buttons described above.

For example, the sizes, colors and arranged positions of the buttons displayed as an operation image are stored in the setting information storage section 61.

In order to display an operation image, the display control section 53 reads setting information from the setting information storage section 61 and displays an operation image according to the settings represented by the setting information that has been read.

This allows for the user U to display the buttons in the size and color of his or her preference.

Further, the size of the text or symbols displayed on the buttons may be changeable. For example, the text or symbols for children or elderly are displayed larger than those for people of other age groups. In this case, the user specifies in advance the size in which the text or symbols will be displayed.

Alternatively, what is displayed on the buttons may be changeable. Although the text "ON" and "OFF" is displayed in the operation images G1 to G3 in the example shown in FIG. 4, the text "Switch ON light" and "Switch OFF light" may be displayed instead.

Further, if a plurality of different operation images, associated with the same device, is available in the information processor 1, the user may be able to specify which operation image to be displayed. For example, the user may be able to specify a setting to display a simple operation image that contains only the ON and OFF buttons or a complex image that allows for elaborate operation of the target device.

Figure 15:
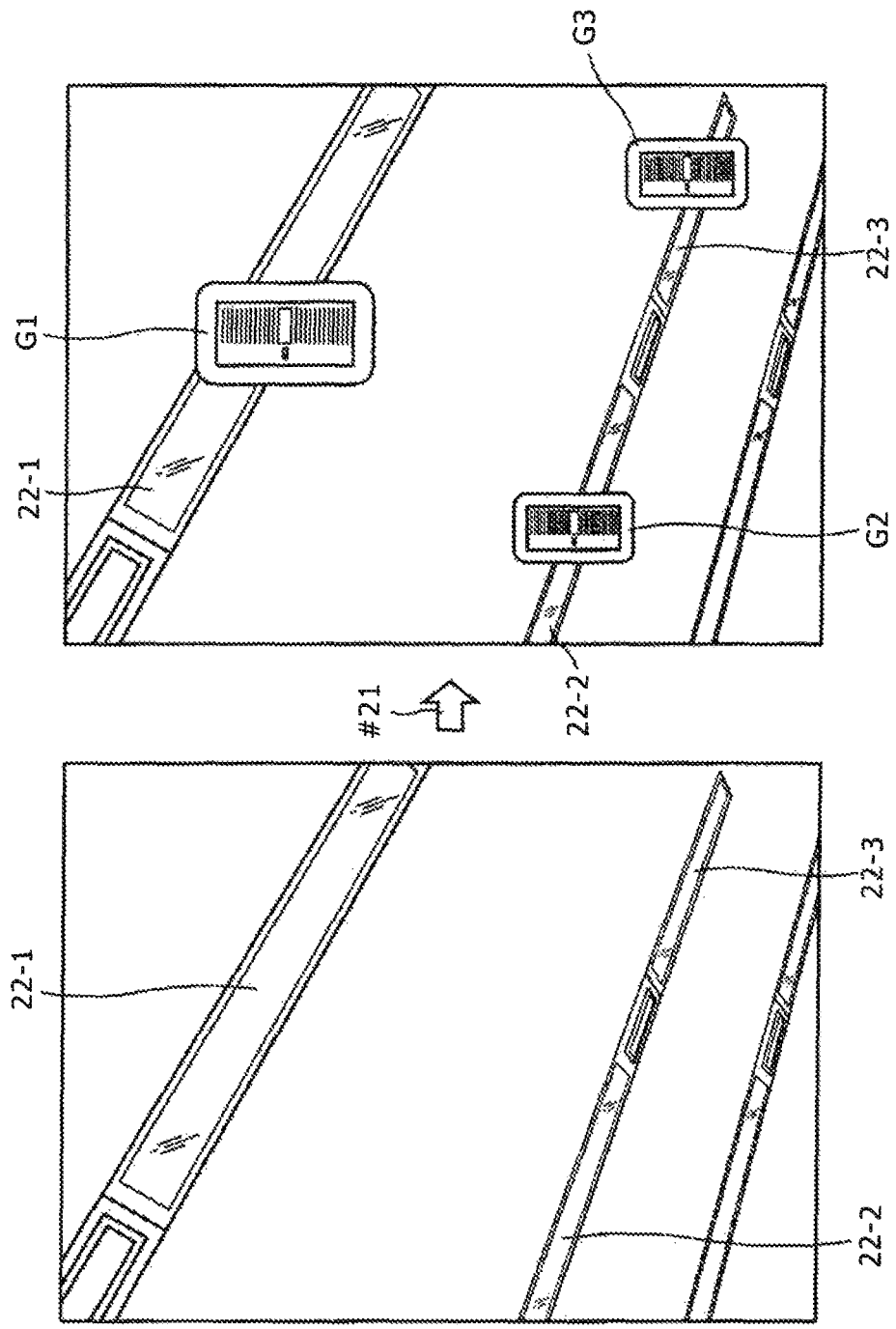
FIG. 15 is a group of diagrams illustrating an example of display of the operation images.
Figure 16:
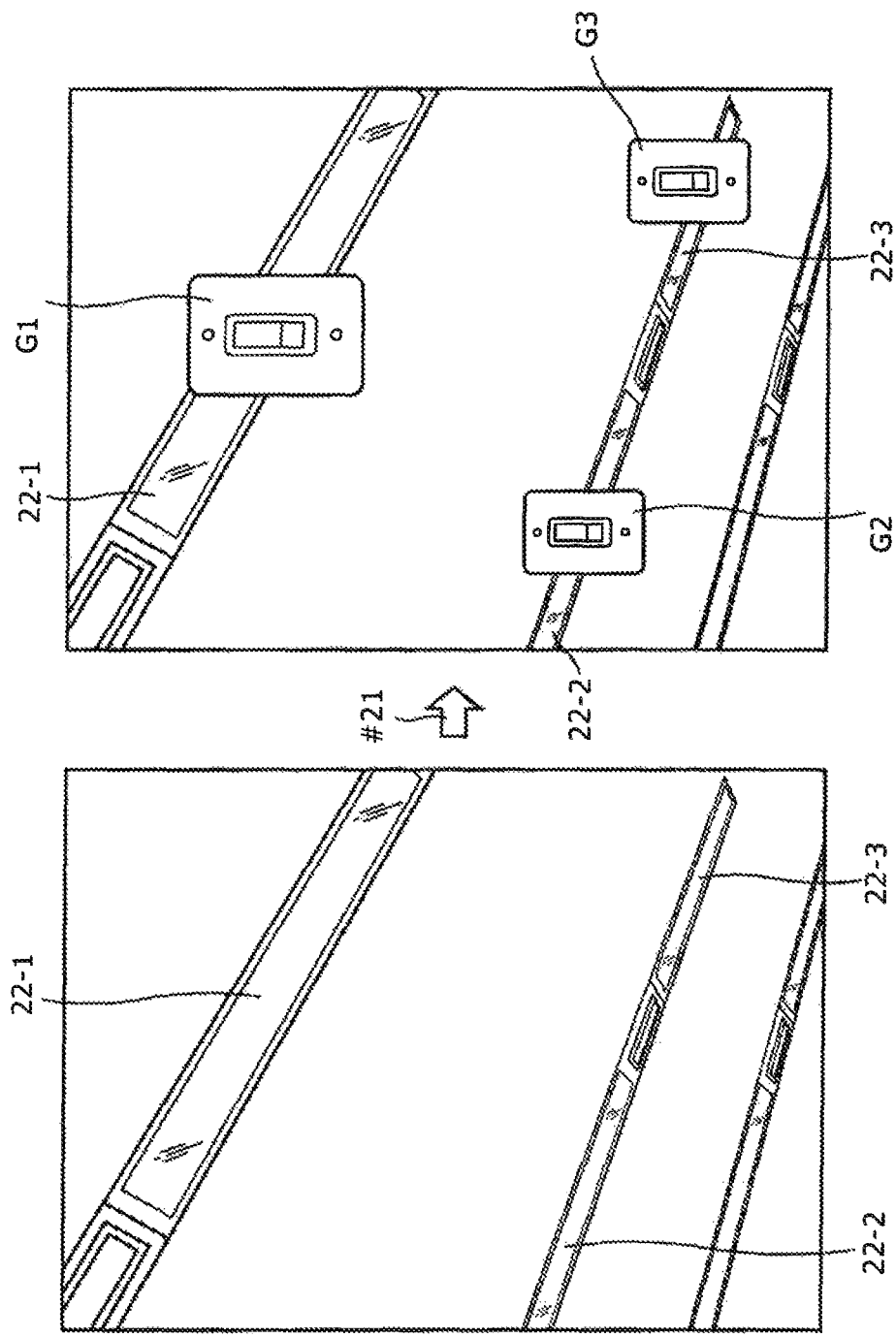
FIG. 16 is a group of diagrams illustrating another example of display of the operation images.

FIGS. 15 and 16 are diagrams illustrating examples of operation images of the lighting devices 22-1 to 22-3.

For example, if two pieces of data are available for the operation images G1 to G3, one as shown on the right in FIG. 15, and another as shown on the right in FIG. 16, the operation images of the lighting devices 22-1 to 22-3 are switched according to the user setting. This allows for the user to operate the target device using the operation image of his or her preference.

Although it was described above that recognition data for target devices is downloaded from the server 71, recognition data may be alternatively generated by the information processor 1 using the image captured by the camera 11 as a model image.

The menu display itself used to set up the display as described above may be customizable on a user-to-user or terminal-to-terminal basis.

On the other hand, a description has been given above of a case in which the HMD 2 is a so-called optical transmission type HMD having the transmissive display 12. Alternatively, however, a video transmission type HMD may be used.

Figure 17:
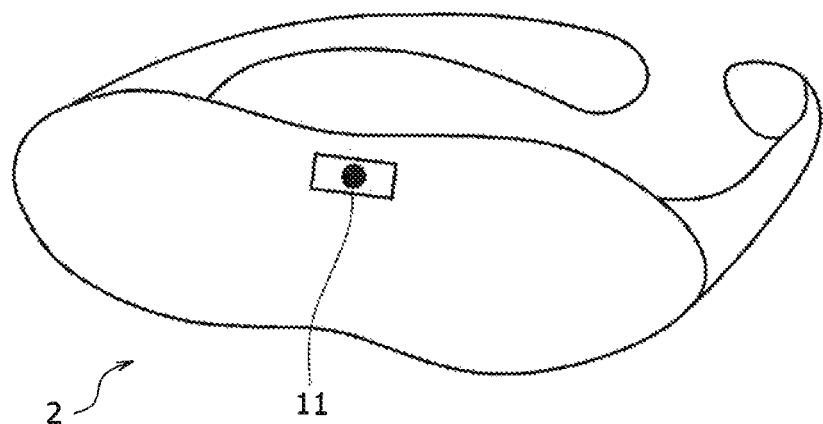
FIG. 17 is a diagram illustrating an example of appearance of a different type of HMD.

FIG. 17 is a diagram illustrating an example of appearance of the video transmission type HMD 2.

The video transmission type HMD 2 is, for example, in the form of eyeglasses. When the HMD 2 is worn, the image captured by the camera 11, attached to face forward from the HMD 2, appears in front of the user U. Further, an operation image or images appear to overlap the target device or devices included in the image captured by the camera 11 as described above.

The display of the image captured by the camera 11 and operation images may be accomplished by means of false image projection that is composed of forming a false image using a half mirror or other device for recognition of the image by the user. Alternatively, the display of the images may be accomplished by retinal projection that is composed of directly forming an image on the retina.

Second Embodiment

Figure 18:
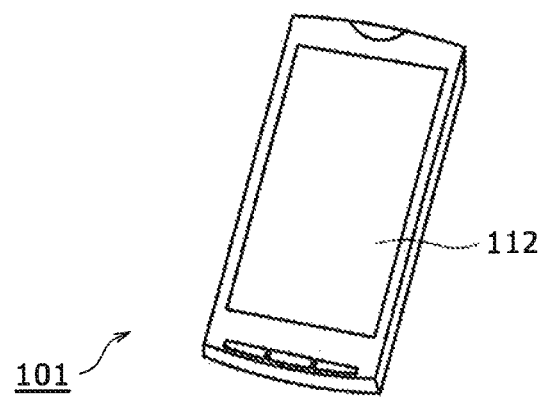
FIG. 18 is a diagram illustrating an example of appearance of a PDA (personal digital assistance)

FIG. 18 is a diagram illustrating an example of appearance of a PDA.

Figure 19:
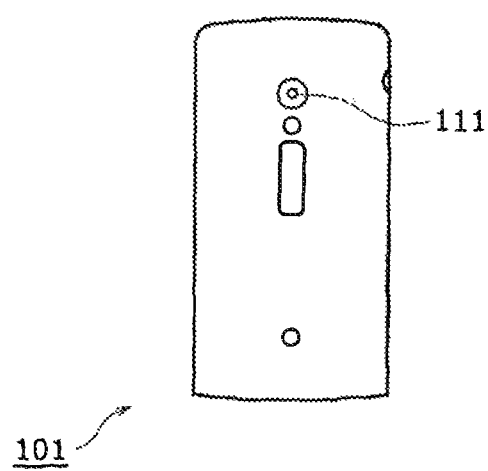
FIG. 19 is a diagram illustrating another example of appearance of the PDA.

A PDA 101 shown in FIG. 18 has capabilities similar to those of the information processor 1. A camera 111 as shown in FIG. 19 is provided on the back of the PDA 101. The image captured by the camera 111 appears on a display 112 provided on the front of the enclosure of the PDA 101. A touch panel, for example, is laminated on the display 112.

For example, if the user U holds the PDA 101 in his or her hand and points the camera 111 in such a manner that the target device is included in the capture range, the target device is displayed on the display 112 and object recognition performed based on the image captured by the camera 111. The camera 111 may be a stereo camera rather than a monocular camera. Further, the camera 111 need not necessarily be provided directly on the PDA 101. Instead, the camera 111 may be provided on a device having an enclosure different from that of the PDA 101. In this case, the image captured by the camera 111 is transferred to the PDA 101 through wired or wireless communication.

On the other hand, when the target device is detected to be included in the image captured by the camera 111, the operation image of the target device appears to overlap the target device displayed on the display 112. An operation image or images are displayed on the display 112 as described, for example, with reference to FIGS. 2 and 4. The user U can operate the target device by directly pressing the operation image displayed on the display 112 with a finger.

<Program>

It should be noted that the above series of processes may be performed by hardware or software. If the series of processes are performed by software, the program making up the software is installed from a program recording medium to a computer incorporated in dedicated hardware, a general-purpose personal computer or other computer.

The program to be installed is supplied recorded on a removable medium 41 shown in FIG. 5 such as optical disc (e.g., CD-ROM (Compact Disc-Read Only Memory), DVD (Digital Versatile Disc)) or semiconductor memory. Alternatively, the program may be supplied via a wired or wireless transmission medium such as local area network, the Internet or digital broadcasting. The program may be installed in advance to the ROM 32 or storage section 38.

The program executed by a computer may include not only the processes performed chronologically according to the described sequence but also those that are performed in parallel or when necessary as when invoked.

The embodiments of the present invention are not limited to those described above, but may be modified in various manners without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processor comprising:
a storage unit configured to store data representing three-dimensional appearance features of a target operational device in a real world and data of an operation image used for operation of the target operational device;
an acquisition unit configured to acquire an image captured by a camera;
a recognition unit configured to recognize an operational device included in the image based on the data representing the three-dimensional appearance features stored in the storage unit;
a finger recognition unit configured to recognize a size of a finger of a user included in the image captured by the camera;
a display control unit configured to display the operation image based on the data of the operation image stored in the storage unit if the operational device included in the image is recognized by the recognition unit as the target operational device in the real world; and
a control unit configured to transmit a command to the recognized target operational device when the size of finger of the user becomes smaller than immediately before,
wherein the display control unit displays the operation image at a position of a display corresponding to a position of the recognized target operational device included in the image, and
wherein the storage unit, the acquisition unit, the recognition unit, the finger recognition unit, the display control unit, and the control unit are each implemented via at least one processor.

2. The information processor of claim 1, wherein the finger recognition unit is further configured to recognize a position of the finger of the user included in the image captured by the camera, and
wherein the control unit is further configured to transmit the command to the recognized target operational device if the position of the finger of the user recognized by the finger recognition unit is corresponding to the position of the operation image displayed on the display, the command adapted to instruct an operation to be performed using the operation image.

3. The information processor of claim 2, wherein
the control unit is further configured to transmit the command when the finger of the user in the image is located at the position corresponding to the position of the operation image displayed on the display and when, at that position in the image, the size of the finger of the user becomes larger again after having become smaller than immediately before.

4. The information processor of claim 1 still further comprising:
a setting information storage unit configured to store setting information representing the details of settings related to the display of the operation image, wherein
the display control unit controls the display of the operation image according to the details of the setting information,
wherein the setting information storage unit is implemented via at least one processor.

5. An information processing method, the method being executed via at least one processor, and comprising:
storing data representing three-dimensional appearance features of a target operational device in a real world and data of an operation image used for operation of the target operational device;
acquiring an image captured by a camera;
recognizing an operational device included in the image based on the data representing the three-dimensional appearance features stored in the storage unit;
recognizing a size of a finger of a user included in the image captured by the camera;
displaying the operation image based on the data of the operation image stored in the storage unit if the operational device included in the image is recognized by the recognition unit as the target operational device in the real world and at a position of a display corresponding to a position of the recognized target operational device included in the image; and
transmitting a command to the recognized target operational device when the size of the finger of the user becomes smaller than immediately before.

6. A non-transitory, computer-readable medium having embodied thereon a program, which when executed by a computer causes the computer to execute a method, the method comprising:
storing data representing three-dimensional appearance features of a target operational device in a real world and data of an operation image used for operation of the target operational device;
acquiring an image captured by a camera;
recognizing an operational device included in the image based on the data representing the three-dimensional appearance features stored in the storage unit;
recognizing a size of a finger of a user included in the image captured by the camera;
displaying the operation image based on the data of the operation image stored in the storage unit if the operational device included in the image is recognized by the recognition unit as the target operational device in the real world; and
transmitting a command to the recognized target operational device when the size of the finger of user becomes smaller than immediately before,
wherein the display control unit displays the operation image at a position of a display corresponding to a position of the target operational device included in the image.

7. The information processor according to claim 1, wherein the operation image is displayed to be overlapping the recognized target operational device.

8. The information processor according to claim 1, wherein the displayed position of the recognized target operational device is changed based on a view of a user.

9. The information processor according to claim 1, wherein a size of the operation image is changed based on a distance between a user and the target operational device.

10. The information processor according to claim 1, wherein the recognition unit is further configured to determine posture information indicating a relative positional relationship between the recognized target operational device and a user.

11. The information processor according to claim 10, wherein the posture information comprises a direction of the user from the recognized target operational device.

12. The information processor according to claim 1, further comprising:
a feature point detection unit configured to determine model feature points based on the stored data representing the three-dimensional appearance features of the target device,
wherein the feature point detection unit is implemented via at least one processor.

13. The information processor according to claim 12, wherein the feature point detection unit is further configured to determine query feature points of the recognized target operational device based on the three-dimensional appearance features of the recognized target operational device.

14. The information processor according to claim 13, further comprising:
a posture estimation unit configured to identify a model having feature points closest to the query feature points and realize the position of the recognized target operational device,
wherein the posture estimation unit is implemented via at least one processor.

15. The information processor according to claim 1, wherein the storage unit is further configured to store a plurality of operation images of the target operational device, and
wherein the display control unit is further configured to display one of the plurality of operation images in accordance with a preference of a user.

* * * * *